April 8, 1952

H. P. WICKLUND 2,591,752

FLIGHT TRAINER

Filed April 16, 1946

INVENTOR.
Harold P. Wicklund
BY
M. C. Hayes
ATTORNEY

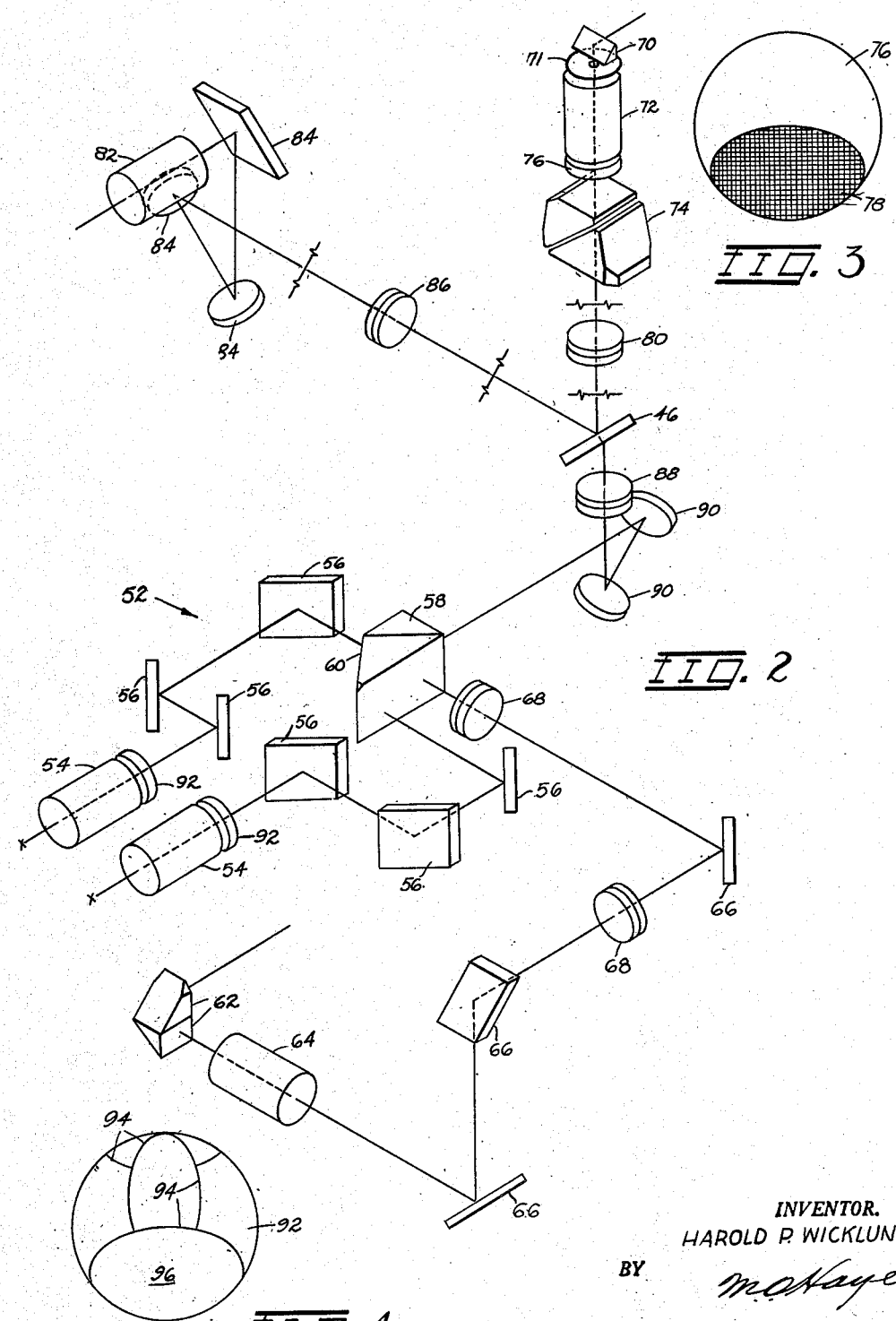

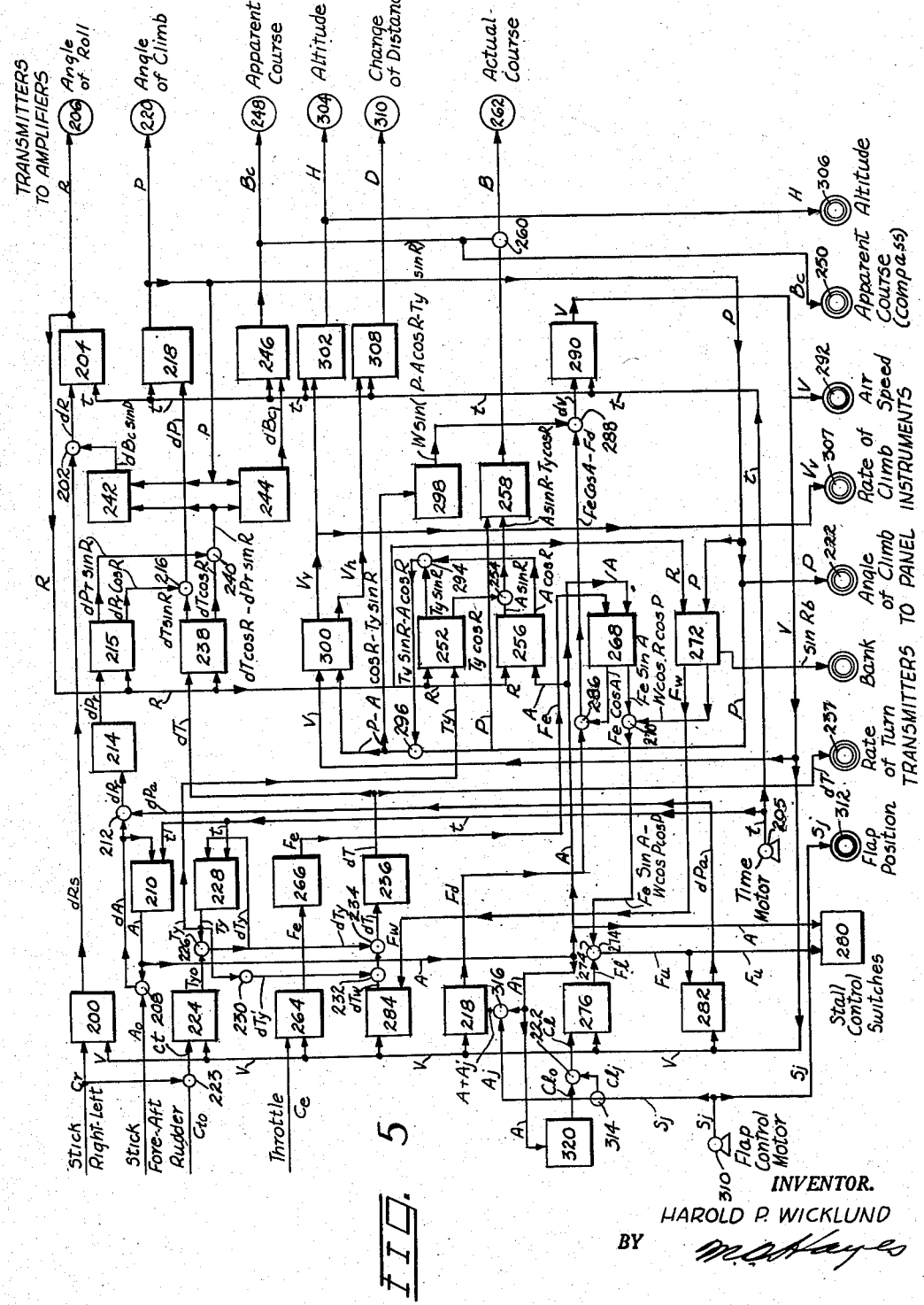

Patented Apr. 8, 1952

2,591,752

UNITED STATES PATENT OFFICE 2,591,752

FLIGHT TRAINER

Harold P. Wicklund, United States Navy

Application April 16, 1946, Serial No. 662,437

10 Claims. (Cl. 35—12)

(Granted under the act of March 3, 1883, as amended April 30, 1928; 370 O. G. 757)

This invention relates to an apparatus and a method for producing an illusion of the effects of the flight and flying of an airplane by a person. Prototype of the present flight trainer is described in "Operation and Maintenance Instructions, Contact Flight Simulator Device 14-L-2, NAVEXOS P-374, Special Devices Center."

Aside from the initial training of a student pilot, the invention has many uses, among which are included such military uses as the briefing of pilots, or, in effect, giving them a preview or familiarization flight over enemy territory that is to be subjected to an attack, training in dive bombing, torpedo attack, low-level bombing, carrier-landing technique, and rocket firing.

An object of this invention is to provide such an apparatus and method for conveniently training personnel in the various phases of flying in an airplane and to provide a convenient means for practicing and demonstrating flying.

Another object is to enable a person to view a scale relief map, landfall, or other three-dimensional model, or a plane model such as an aerial photograph from different attitudes and scale altitudes in such a manner that the person can, by the movement of simulated aircraft controls, produce the illusion, with proper relative motion, of actual flying over the actual objects (pertaining to terrain or models) at the corresponding real attitudes or altitudes, such that a realistic impression of flying a real airplane results.

Another object is to provide a compact and relatively simple, inexpensive apparatus for performing the function of several large expensive and complicated training devices hitherto employed.

Further objects and advantages of this invention, as well as its construction, arrangement and operation, are apparent from the following description and claims in connection with the accompanying drawings, in which, Fig. 1 is a diagrammatic illustration of the training device of this invention, Fig. 2 is a diagrammatic illustration of an optical system suitable for use in the device shown in Fig. 1, Fig. 3 is a diagrammatic illustration of a masking element used in connection with the optical system of Fig. 2.

Fig. 4 is a diagrammatic illustration of another of the masking elements used in the system of Fig. 2, and Fig. 5 is a schematic diagram showing in block form the equipment comprising the computer unit of the device of Fig. 1.

General arrangement

According to this invention the pilot can sit behind the controls in a mock cockpit assembly and view through an optical viewing system an area containing a model of terrain in such detail as to produce an effect of realism. As used herein "terrain" refers to any area of the earth including land and/or water and/or air. The elements of the optical viewing system are remotely controlled, in response to manipulations of the mock control elements by the pilot in the cockpit, in such manner as to produce an image of the model that simulates and transmits to the pilot the illusion of seeing an actual view as would be seen from the cockpit of a real plane. An instrument panel, upon which appropriate flight data is indicated, is also introduced into the observer's field of vision through the optical system.

Control of the optical elements is accomplished by means of a computer unit that in response to control input data and aerodynamic constant input data automatically solves the equations of flight in conjunction with the flight characteristics of the particular plane chosen and transmits this data to a servo-amplifying system. This system amplifies the output signals from the computer unit to the proper proportionate quantities and transmits the amplified signals to appropriate instruments and motor drives throughout the device.

Further to produce the illusion of flying, proper noise conditions are provided by a noise simulator that is automatically controlled simultaneously with the other apparatus so that the pitch, frequency and volume of the noise vary as a function of air speed, propeller-pitch setting, and R. P. M. of the simulated engine. In addition, a mechanism is provided to produce the effects of stalling, operating as a function of the lift force and angle of attack so that when these quantities are of values compatible with a stalled condition the pilot's seat receives a shuddering impulse representing the flight instability of the plane at the moment, the control forces are diminished, and the controls accordingly become slack or sloppy.

The device is also provided with means to enable an instructor to observe the simulated effect through the optical system and to enable him to converse with the student pilot.

Detailed description

Figure 1:
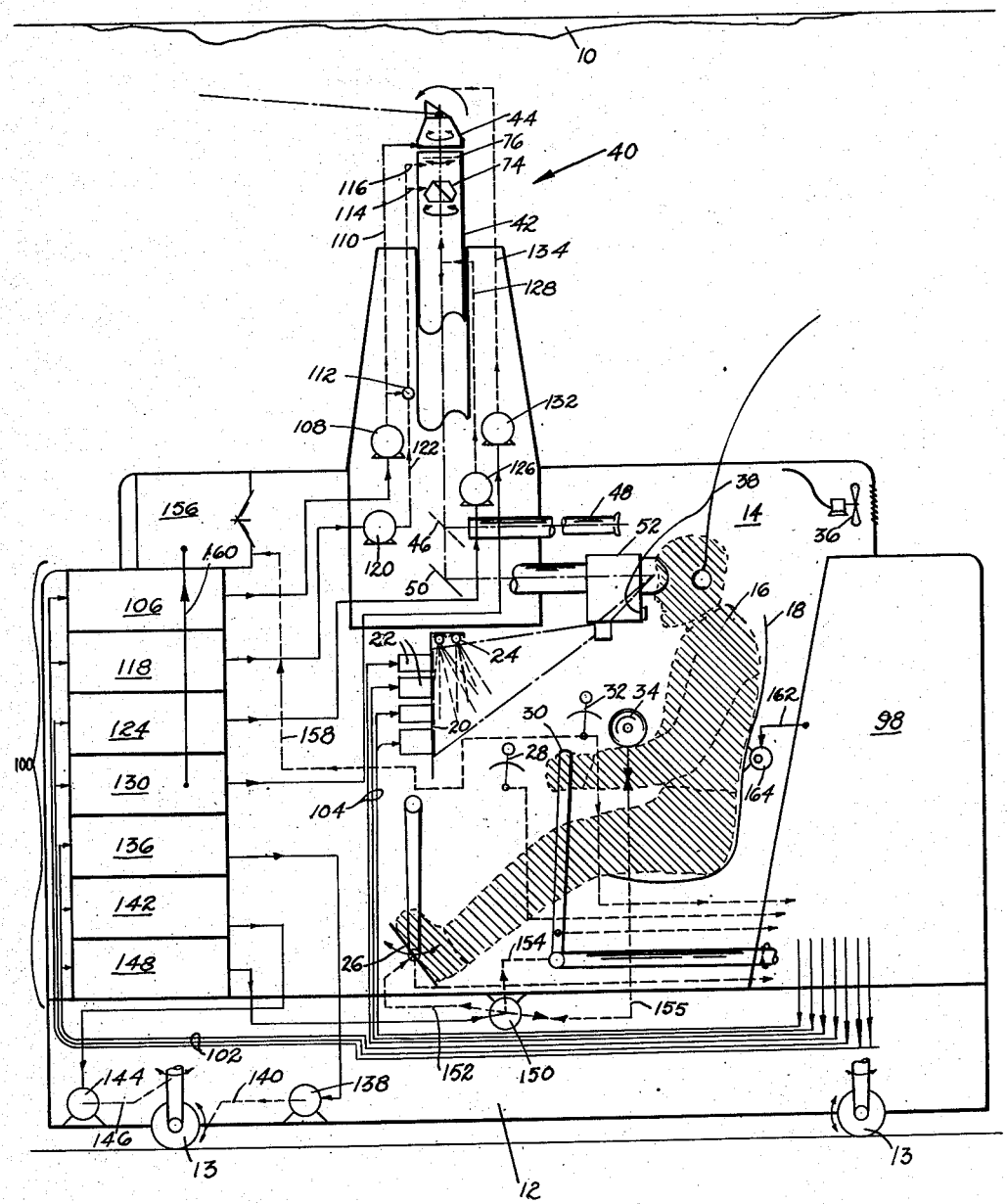
Figure 6:
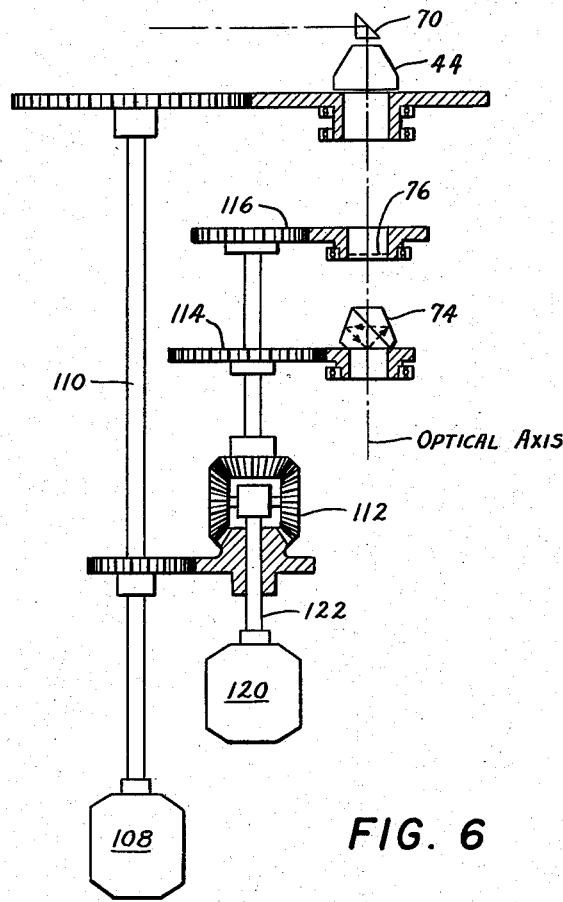

Fig. 1 shows an area 10 suspended from the overhead in an inverted position and containing models of terrain in sufficient detail to produce an effect of realism when viewed through the optical system to be described below. A curtain (not shown) can be provided around the periphery of the area 10 and blended in to represent the sky.

The training device comprises an enclosed unit or cart 12 capable of controlled motion in one plane of the operating area (as by means of crab wheels 13), the interior 14 of which is substantially a replica of the cockpit of an actual airplane, insofar for example as the controls, instrument panel, seating of pilot, are concerned. A pilot, as 16, enters through a door, not shown, and is seated in a chair 18.

The instrument panel designated as 20 includes appropriate indicating instruments as 22 for denoting such conditions as air speed, bank, rate of turn, flap position, angle of climb, rate of climb, altitude and apparent course. The panel 20 is illuminated by means of fluorescent lamps 24 or other lighting means of a suitable type.

The controls include rudder pedals 26, flap position lever 28, control stick 30 for ailerons and elevators, throttle lever 32, and control lever 34 for governing trimming tabs.

Ventilation is provided as by means of a fan 36. An instructor can converse with the student pilot by means of a communication system provided at 38.

Mounted upon the cart 12 is an optical viewing system, generally designated as 40, remotely controlled by electro-mechanical means in such a manner that the optical components are altered in their relative positions so as to produce an image of the model 10 that simulates and transmits to the pilot 16, seated within the mock cockpit, the illusion of seeing from the pilot's enclosure of an airplane the actual view as would be seen from a real plane in flying.

Optical system

The optical device 40, as seen in Fig. 1, includes a periscope 42 having rotatable head 44 containing a pitch-angle prism and an objective-lens assembly, as will be described below in connection with Fig. 2. Light rays from the objective lens assembly are passed through various optical elements, described below, and through a partly reflecting mirror 46 that reflects part of the rays to an instructor's scope 48 and passes the remainder to a mirror 50 and thence to an observer's viewing head 52. The instructor's scope 48 is conveniently placed at, for example, a 90° angle to the main viewing head 52 and extends outside of the cart 12 so that an instructor located on the outside of the device can view the same image of the model 10 as the operator 16. A seat (not shown) can be provided for the instructor if desired. The scope 48 can be telescoped for retracting the instructor's scope to within the confines of the device.

The vertical tube of the periscope 42 contains an optical collimating system enabling it to be mechanically telescoped within itself in response to control signals in order to retract the objective lens from the terrain so as to create the effect of changing altitudes.

An image of the instrument panel 20 is introduced into the observer's view in its proper relative position by means of a split field in the optical system.

The optical system is better understood by reference to Fig. 2, in which is illustrated diagrammatically the observer's viewing head 52, which can be a conventional stereoptic binocular viewing head with adjustable interocular distance and independent focusing arrangement for each eye at eyepiece assemblies 54 into which the observer 16 (Fig. 1) looks. Front-surfaced mirrors 56 and two right-angle prisms 58 and 60 complete the viewing-head assembly.

The right-angle prisms 58 and 60 are so constructed and arranged as to allow an image of the instrument panel 20 (Fig. 1) to be superimposed upon a part of the main field of vision from the relief map 10. This is accomplished by means of right-angle prisms 62 that pick up rays from the instrument panel 20 and direct them through objective lens assembly 64, mirrors 66 and erector doublets 68 to the right-angle prisms 58 and 60.

Rays from the relief map 10 enter the pitch angle or elevation prism 70 mounted for rotation upon periscope head 44 about a horizontal axis perpendicular to the center line of sight of the optical system. Such rotation causes the center line of sight to be angularly displaced from a horizontal reference line perpendicular to the axis of rotation and said center line of sight has its angular traverse remain in a vertical plane passing perpendicularly through the axis of rotation at the optical center line. Such rotation causes an apparent change in "attitude," or angle at which the object is viewed. The image thus formed is in vertical alignment with the center line of the optical system. The apparent center of rotation of the image is coincident with the real center of rotation of the optical elements.

Immediately below the elevation prism 70 is a stationary entrance pupil 71 having an aperture of small diameter, as for example, in the order of 2 millimeters. The entrance pupil size is to gain a depth of continuous focus for all objects appearing between the elevation prism 70 and infinity. The exit pupils contained in objective-lens assemblies 54 and 82 are of the same diameter as the entrance pupil 71.

Also mounted in the rotatable head 44 of the periscope 42 (Fig. 1) is an objective-lens assembly 72 (Fig. 2). The objective-lens assembly 72 and pitch-angle prism 70, including the housing, are so designed that the point at which the observer's eye appears to be (i. e., at the axis of rotation of the object prism), can be moved very close to the model being viewed. The assembly is also remotely controllable in rotation about the vertical axis as described above in connection with Fig. 1 so that an apparent change in heading in azimuth or turning can be achieved without necessitating rotation of the cart 12. Such rotation is coordinated with the change in azimuth of the cart crab wheels and is properly compensated through a derotating prism 74, so that the image is not rotated at the binocular eyepiece 54.

The derotating prism 74, which can be of the type known to the art as a dove or "Schmidt" prism, also effects the illusion of banking by an independent rotation in response to the proper control data. The rotation of this prism is about its optical center line and it is not restrained as to the number of rotations.

A masking element 76, shown diagrammatically in Fig. 1 and in detail in Fig. 3, having an opaque section 78 so as to obscure that portion of the main optical field that coincides with the interruption of the pilot's field of vision normally occupied by the engine cowling and instrument panel, is placed between the objective lens assembly 72 and the derotating prism 74. This mask is concomitantly and with the proper ratio rotated so as to appear stationary whenever rotation of the derotating prism 74 occurs.

Following the derotating prism 74 is a collimating doublet 80. Between this and the mirror 46 the system is telescoped to simulate changes in altitudes.

Mirror 46 is of a type that partly transmits and partly reflects the light, enabling an instructor to view the relief map or model 10 through the scope 48 (Fig. 1) by virtue of eyepiece assembly 82, appropriately placed reflecting mirrors 84 and collimating doublet 86. This system, as aforestated, can also be telescoped between the collimating doublet and the reflecting mirror for purposes of retracting into the device when not in use.

The light passing through the partly reflecting mirror 46 passes through a collecting doublet 88 and is reflected by appropriate mirrors 90 (combined as mirror 50 in Fig. 1), through the right-angle prisms 58 and 60 of the viewing head 52, and thence to the observer 16 seated in the mock cockpit enclosure 14, (Fig. 1).

A masking element 92, a plan view of which is shown in Fig. 4, having masking strips 94, is included in each eyepiece assembly 54 adjacent to the field lens of that assembly so that the view as seen by the observer 16 appears to be partly obstructed by structural members of an airplane cockpit as in a real plane. The instrument-panel field of vision is superimposed in the area 96, corresponding to that portion of the main field of vision blocked by area 78 of mask 76 (Fig. 3), by means of the prisms, lens, and mirror assembly previously described.

Servo-Amplifying System

As stated above, the optical elements are controlled in response to the simulated control elements in the cockpit by means of an aerodynamic computer and servo-amplifying system.

As indicated in Fig. 1, a computing unit 98, that can be electronic, mechanical or electromechanical, automatically solves the equations of flight by equating the input control signals of rates and positions of the throttle 32, stick 30, rudder 26, flaps 28 and other control equipment with the flight characteristics data of the plane and the aerodynamic variables, and solves for the resultant effects of all the variables, such as, air speed, angle of attack, bank, climb and dive, turn, rates of response to controls, forces required to operate controls, and the like. These computed data are then transmitted to a servo-amplifying mechanism, generally designated as 100, that receives the input signals and amplifies them to the proper proportionate electrical quantities and transmits these data to appropriate instruments and motor drives of the device so that rotation and movement of the elements of the above described optical system are as described.

The servo-amplifying system consists of a plurality of any type of commercial servo-amplifiers, the adaption of which to the present application are readily apparent to those skilled in the art. A prime requisite of the system is amplification of the computer signals such that they can be used as accurate motor control. Each amplifier of the system receives signals from the aerodynamic computer 98, which signals are then amplified to the proper electrical quantities for controlling the appropriate motors. In Figure 1, outputs from the computer 98 to amplifying system 100 are diagrammatically illustrated by lines 102. Outputs from the computer to the instrument panel 20 are likewise illustrated diagrammatically by a group of lines at 104. The lines thus shown represent a plurality of independent connections between amplifiers 100, instruments 22 and the computer 98.

The servo-amplifying system 100 includes an "apparent-course amplifier" 106 that receives an apparent-course data signal from the computing device 98 and sends a properly amplified electrical quantity to a servo-motor 108 that rotates the periscope head 44 containing pitch-angle prism 70 and objective-lens assembly 72 about a vertical axis so that the operator 16 receives the illusion of a change in heading relative to the earth. The mechanical connection between the periscope head 44 and motor 108 is denoted by dashed line 110. Derotating prism 74 and masking lens 76 are rotated simultaneously by means of mechanical connections at 112, 114 and 116 as explained in the above description of the optical system. A corresponding signal is transmitted direct from the computer 98 to an apparent-course indicator on the control panel 20 as by one of the lines 104, no amplification of the signal being necessary for operation of the indicating instrument.

"Apparent course" as used herein is defined as the angle measured in the horizontal plane, clockwise from the north, to the vertical plane containing the fore and aft or fuselage axis of the airplane. The apparent course can be angularly displaced from the "actual course," or angle measured in the horizontal plane, clockwise from the north, to the vertical plane containing the flight path, by an amount depending on the instant flight conditions. Apparent course is indicated by the compass in both the trainer and an actual plane.

A "roll-amplifier" 118 receives angle-of-roll data from computer 98, and sends an amplified electrical quantity to servo-motor 120, which controls by mechanical connection 122 the rotation of the Schmidt or derotating prism 74 and mask 76 to produce the illusion of banking and rolling. This datum, correlated with pitch-angle data in the computer 98, is sent direct through one of lines 104 to a banking indicator on instrument panel 20. To effect a change in apparent course, motor 108 causes shaft 110 to rotate assembly 44 in azimuth. Such rotation alone would cause the image as seen by the observer through prisms 74 and 70 (Fig. 2) to rotate about the optical axis as well as the intended change in azimuth or shifting of the image laterally. Therefore, to nollify such erroneous rotation, differential 112 from shaft 110 causes rotation of gear 114, which in turn through a gear attached with derotating prism 74 causes it to rotate in the same direction as assembly 44 but at twice the speed of assembly 44, thereby causing the image to be translated laterally without rotation. However, the rotation of prism 74 would also cause the image of the mask 76 to rotate at twice the speed of rotation of prism 74. It is therefore necessary through gear 116 to rotate the mask 76 in the same direction as prism 74 but at one half the speed of prism 74.

It is obvious that when the angle of roll motor 120 alone operates shaft 122 through the differential 112, the gears 114 and 116 will cause the prism 74 to be rotated at twice the speed of the mask 76 thereby causing rotation of the image of the object which is external to the optics without rotation of the image of the mask 76 which is in the optical system. This operation will of course not cause movement of shaft 110.

It is obvious that both motors 108 and 120 may operate simultaneously with proper correlation of their separate functions.

A "vertical-velocity" or change-of-altitude amplifier 124 receives data from computer 98 and sends properly amplified electrical data to motor 126 that through mechanical linkage 128 telescopes or extends the optics, as previously described, to produce the illusion of changing altitude corresponding to the rate of dive or climb. Corresponding altitude data are sent direct from the computer 98 via one of lines 104 to an altitude-indicating instrument or altimeter on the instrument panel 20. Appropriate data are also transmitted from computer 98 to an instrument for indicating the rate of climb.

A "pitch" amplifier 130 receives pitch-angle data from computer 98 and sends the properly amplified quantity to servo-motor 132 which by mechanical linkage 134 rotates the pitch-angle prism 70 (Fig. 2) about a horizontal axis so as to simulate a proper pitch angle as the airplane apparently climbs or dives. A corresponding signal is sent direct from computer 98 via one of lines 104 to an angle-of-climb indicating instrument on the panel 20.

A horizontal-speed amplifier 136 receives velocity data from computer 98 and sends the corresponding amplified electrical data to servomotor 138 that drives, by means of mechanical linkage 140, the several crab wheels 13 mounted on the chassis of the cart 12 so as to provide a movement of the cart that corresponds to the horizontal speed of the craft along its line of flight. Properly correlated vertical and horizontal-velocity data are also provided, via one of lines 104 directly from computer 98 to an airspeed indicator on instrument panel 20.

A direction or actual-course amplifier 142 receives actual-course data from computer 98, and sends a corresponding electrical signal to servomotor 144, that through mechanical linkage 146, controls the direction of the crab wheels 13 so as to control the direction of movement of the cart 12 so that a simulation of change of course of the flight path relative to the earth is provided.

A control-loading amplifier 148 receives a signal from computer 98 that varies as a function of air speed and accordingly provides an amplified electrical control quantity to servo-motor 150 that through mechanical linkages 152, 154 and 155 decreases and increases the force opposing operations of the rudder 26, stick 30, and trim tab control 34. The trim-tab control 34 functions to shift the neutral-load position of the other controls 26 and 30 such that the apparent trim condition of the plane is altered.

In order to produce noises of proper pitch, frequency and volume a conventional noise amplifier 156 is provided and controlled as a function of throttle setting, as by mechanical linkage 158, and as a function of angle of pitch by means of electrical control signals from amplifier 130 through connection shown at 160.

Computer 98 also provides control data as at 162 (Fig. 1) for operation of a motor 164 for producing vibrations of the operator's chair 18 simulating stalling conditions. The vibration unit can include a cam system operated by motor 164 in a manner well known to the art.

Electrical power for the amplifiers and motors can be provided from a suitable source (not shown) at conventional voltage and frequency. A switch (not shown) can be provided in the mock cockpit for connecting the various elements to the power source.

Appropriate limit stops (not shown) are provided to confine the cart unit 12 to the boundaries of the deck upon which it moves, and to prevent the periscope from over-extending and crashing into the model or retraction beyond the limit of the optical system.

Aero-dynamic computer

The operation and construction of the computer unit 98 is better understood by reference to Fig. 5. All of the elements of this device are of conventional design and any novelty in connection therewith resides in the combination of these elements, together with some specific functional elements representative of the particular flight characteristics of the plane, in the manner described below to accomplish the function of correlating these flight characteristics data and control data and solving the equations of flight for controlling movement of the optical elements and cockpit unit in accordance with the requirements of the present flight trainer and related devices.

The function of the aerodynamic computer unit is to connect controls and optical illusion mechanism in the proper manner. Its inputs are control displacements; its outputs are angles and velocity components, specifying at any time the resulting attitudes and motion along the flight path of the airplane.

In order to simplify the description of the input and output quantities of the computer elements symbols and terms are used throughout as defined below:

Flight path—The actual path of the center of gravity of the airplane.

X-axis—Fuselage axis or fore-and-aft axis through the center of gravity of the airplane.

Y-axis—Wing axis or the axis through the center of gravity parallel to a line connecting the wing tips of the airplane.

Z-axis—Axis through the center of gravity and perpendicular to both the X- and Y-axes.

P—Angle of climb or angle between the X-axis and the horizontal plane measured in the vertical plane through the X-axis.

$P'_r$—Angle of pitch or angle through which the fuselage or X-axis must be rotated about the wing or Y-axis in the XZ plane in order to become horizontal.

Rotation about the wing axis is termed pitching. That part of $$\frac{dP'_r}{dt}$$

which is due to pitching alone will be denoted by $$\frac{dP_r}{dt}$$

$P'_a$—Angle of pitch of flight path or the angle between the flight path and the horizontal plane measured in the plane containing the flight path and perpendicular to the X—Y plane.

$\frac{dP_a}{dt}$ denotes that part of $\frac{dP'_a}{dt}$ which results from pitching alone.

R—Angle of roll or the angle through which the Y-axis must be rotated about the X-axis to become horizontal.

$R_b$—Angle between the wing or Y-axis and the horizontal plane measured in a vertical plane through the wing axis.

$R_s$—That part of R or angle of roll due to lateral movement of the stick.

B—Actual course or the vertical projection to the earth of the line of flight. The direction of such projected line is the angle measured in the horizontal plane clockwise from the north to the vertical projection of the line of flight on HTE horizontal plane.

Bc—Apparent course or the vertical projection to the earth of the X-axis. The direction of such projected line is the angle measured in the horizontal plane clockwise from the north to the vertical projection of the X-axis on the horizontal plane.

T—That part of T' due to turning alone.

T'—Angle of turn or angle through which the fuselage must be rotated about the Z-axis in order to attain a predetermined heading.

$T_y$—Angle of yaw or angle of rotation of the fuselage about the Z-axis necessary to make the XZ plane contain the flight path.

$T'_y$—That part of T due to a deflected position of the rudder.

$T_w$—That part of T due to force on right wing as a resultant of lateral movement of the stick.

A—Angle of attack or the angle between the flight path and the XY plane measured in the plane containing the flight path and perpendicular to the XY plane.

$A_o$—That part of A due to fore and aft displacement of the stick=$KS_a$.

$A_j$—Increase in the angle A due to use of flaps.

F—Forces acting upon the airplane.

W—Weight of the airplane.

$F'_1$—The lift force acting perpendicular to the wind axis and the direction of motion.

$F_d$—Drag force acting aft along the flight path.

$F_e$—Thrust force developed by the propeller, acting forward along the fuselage.

$F_f$—Resultant force acting forward along the flight path.

$F_u$—Resultant force perpendicular to the wing axis and the direction of motion.

$F_w$—Resultant force along the Y-axis.

$C_e$—Percent of full throttle=$KS_e$.

$C_d$—Coefficient of drag.

$C_{lo}$—Coefficient of lift due to wings.

$C_{lj}$—Coefficient of lift due to flaps.

$C_l$—Total coefficient of lift ($C_l = C_{lo} + C_{lj}$).

$C_r$—Coefficient of roll=$KS_r$.

$C_{to}$—Coefficient of yaw due to rudder=$KS_t$.

$C_t$—Total coefficient of yaw.

$S_a$—Fore and aft displacement of stick in degrees.

$S_j$—Flap control displacement in degrees.

$S_r$—Lateral displacement of stick in degrees.

$S_t$—Rudder pedal displacement in degrees.

$S_e$—Throttle control displacement in degrees.

V—Airspeed along flight path.

$V_h$—Horizontal component of air speed.

$V_v$—Vertical component of air speed.

t—Time.

M—Mass of airplane.

H—Altitude of airplane above sea level.

e—Density of air.

K—All constants.

The quantities required as computer outputs for controlling movement of the cockpit and optical elements of the flight-simulating device of this invention are angular components "P" representative of the angle of climb, "R" representative of the angle of roll, and "Bc" representative of apparent course, for the airplane's attitudes, and "$V_h$" representative of horizontal velocity, "$V_v$" representative of vertical velocity, and "B" representative of the actual course, for the motion of the airplane's center of gravity relative to the ground.

Assuming the use of indicating instruments denoting flap position, rate of turn, bank, airspeed, angle of climb, rate of climb, altitude, and apparent course, additional output quantities "$S_j$," representative of flap-control displacement, "dT," representative of rate of turn, "sin $R_b$" representative of the angle of bank, and "V" representative of air speed, are required. Output quantities "$F_u$," representative of lift force upon the wing and, "A," representative of angle of attack are also required in order to operate the stalling mechanism. Thus the total output quantities are P, R, B, Bc, V, $V_h$, H, $S_j$, dT and sin $R_b$.

On the diagram Fig. 5, and in the following description rates are written without the dt for the sake of brevity, e. g., $$\frac{dA}{dt}$$

appears as dA.

The inputs to the computer are $KS_r$ or $C_r$ representative of lateral displacement of the stick, $KS_a$ or $A_o$, representative of fore and aft movement of the stick, $KS_t$ or $C_{to}$ representative of rudder displacement, $KS_e$ or $C_e$ representative of throttle control displacement, $S_j$ representative of flap-control displacement and time t. The value of K in each of the above instances varies in accordance with the particular control displacement. Thus, as will be more fully explained below, the value of K for a particular control setting can be supplied by a cam or other element designed in accordance with wind-tunnel data for the particular control surface and airplane to be simulated, and actuated by a shaft or other means from the control element. In addition to these inputs the weight W, mass M of the airplane, and other aerodynamic constants are taken into consideration in certain of the computer elements. The value of such constants depends upon the particular airplane it is desired to simulate.

As indicated in Fig. 5, multiplier 200 multiplies a quantity $C_r$ set up by lateral movement of the control stick, with an input quantity V representative of airspeed. The operation of the multiplier element 200 is based on the equation, well known in the art, that rolling moment is equal to the algebraic sum of the lift moments acting on the plane about its longitudinal axis through its center of gravity. This quantity is also equal to the coefficient of roll times the velocity. The coefficient of roll varies as a function of the mean or average angle that the movable control surface makes with the corresponding fixed surface. In the multiplier 200 roll coefficient for the instant angle of the movable control surface can be supplied by means of a mechanical or electrical cam, designed in accordance with wind-tunnel data for the particular plane to be simulated to represent the variable roll coefficient, and actuated by the lateral displacement of the control stick. The output of the multiplier element is thereby representative of the rolling moments inherently present for successive differences of control displacement and velocity.

The output rate of roll $dR_s$ is added by an adding mechanism at 202 to an additional rate of roll $dB_c$ sin P giving an output total rate of roll dR that is integrated with respect to time t by integrating mechanism 204 to provide output quantity R.

The time input t to the integrating mechanism and to other elements of the computer unit is provided by a synchronous timing motor 205.

The quantity R, representative of the instant angle of roll, is sent to a transmitter 206 that sends an electrical signal to roll amplifier 118 (Figure 1).

As aforestated, the computer elements, i. e., multipliers, etc. can be either mechanical, electromechanical or electronic. If mechanical elements are used throughout the computing system, the transmitter units can be of any type conventionally used for coupling mechanical and electrical equipment such as those known to the trade under the names of "Selsyn," "Autosyn" or "Synchro" units, or the coupling can be directly mechanical to servo-amplifier controls.

The input quantity $A_o$ or $KS_a$, due to fore and aft movement of the stick, is added to a quantity A, representative of the angle of attack, by adding mechanism 208, providing an output $dA$ that in turn is provided as an input to integrating mechanism 210. The quantity $dA$ is integrated by mechanism 210 with respect to time, $t$, to provide the quantity A used in adding mechanism 208, above.

The quantity $dA$ is also provided to adding mechanism 212 where it is added to a rate $dP_a$ to provide an output $dP_r$ that, in turn, through follow-up mechanism 214, is introduced as an input to a component solver 215. Component solver 215 also receives quantity R as an input and provides outputs $dP_r \sin R$ and $dP_r \cos R$. One of the output rates from component solver 215, $dP_r \cos R$, is added by adding mechanism 216 to a rate $dT \sin R$ to give an output $dP$ that when integrated by integrating mechanism 218 provides output quantity P, that is sent to a transmitter 220 for transmission to pitch-angle amplifier 130 (Fig. 1). The quantity P is also sent to a transmitter 222 for transmission to an "angle of climb" indicating instrument on panel 20 (Fig. 1).

The rudder input quantity $KS_t$ or $C_{to}$ as determined by a cam unit for the instant rudder displacement is added algebraically to the lateral stick input $C_r$ by adding mechanism 223 that provides an output quantity $C_t$ equal to $C_{to} - KC_r$.

Thus lateral stick input is linked with rudder input; use of the stick for rolling right (left) wing down automatically sets up an angle of yaw by actuating the left (right) rudder making it necessary for the student pilot to apply right (left) rudder pedal if he wants to make a proper turn (without angle of yaw, i. e., without slip or skid). The use of rudder alone (no movement of the stick) sets up an angle of yaw proportional to rudder pedal displacement and airspeed. Thus the rudder can be used either to set up or eliminate angle of yaw. The rudder also sets up a small rate of turn $dT'_y$ that is taken into consideration in the computer elements to be described below.

The output quantity $C_t$ from adding mechanism 223 is multiplied with the airspeed V by multiplier 224 to provide an output that is added to $T_y$ by adding mechanism 226 to give $dT_y$. The rate $dT_y$ is input to integrating mechanism 228 where it is integrated with respect to time $t$ to provide the quantity $T_y$ input to adding mechanism 226.

The quantity $T_y$ is also input to mechanism 230 providing the rate $dT'_y$ equal to $KT_y$ that is input to mechanism 232 where it is added to a rate $dT_w$, representative of the rate of turn due to lifting force upon the wings. This sum is added to $dT_y$ by mechanism 234 providing the total rate of turn $dT$, i. e., equal to $$(dT'_y + dT_w + dT_y)$$

The rate $dT$ is amplified by follow-up mechanism 236 and sent to a rate-of-turn transmitter 237 for transmission to one of the indicating instruments on panel 20 (Fig. 1). Rate $dT$ is also supplied as an input quantity to component solver 238 that receives R as its other input quantity and provides $dT \sin R$ and $dT \cos R$ as outputs. The first of these outputs $dT \sin R$ is supplied to adding mechanism 216 as aforementioned. The second output $dT \cos R$ is added by mechanism 240 to the other output $dP_r \sin R$ of the component solver 215 providing the rate $dT \cos R - dP_r \sin R$ that is supplied to multiplying mechanisms 242 and 244 that also receive the quantity P as inputs. Multiplier 242 multiplies $$dT \cos R - dP_r \sin R \times \tan P$$

to provide the rate $dB_c \sin P$ used in adding mechanism 202. The other multiplier 244 multiplies $dT \cos R - dP_r \sin R \times \sec P$ providing a rate $dB_c$ that is integrated with respect to $t$ by integrator 246 giving the quantity $B_c$. Data representative of this quantity is transmitted by transmitter 248 to "apparent course" amplifier 106 (Fig. 1) and by transmitter 250 to an apparent-course indicator on instrument panel 20 (Fig. 1).

The output quantity $T_y$ from integrator 228 is also supplied as an input to a component solver 252 that receives the quantity R as another input and provides output $T_y \sin R$ and $T_y \cos R$. The latter output quantity $T_y \cos R$ is added by mechanism 254 to one of the output quantities $A \sin R$ from a component solver 256 that receives as input components R and A. The output from adding mechanism 254 is $A \sin R - T_y \cos R$. This quantity is multiplied with the quantity P by multiplier 258 to provide an output that, when added to apparent course quantity $B_c$ at adding mechanism 260, provides an output B representative of the actual course relative to the ground. Data representative of the quantity B is transmitted by transmitter 262 to "actual course" amplifier 142 (Fig. 1).

By following through the computer elements it can be seen that apparent course and actual course data are initiated by both stick and rudder controls, and that this data is based on actual flight characteristics as determined by wind tunnel data and as introduced into the computer system by means of the cam units previously described. Thus the final course data provided by the computer unit is representative of the turning moments inherently present for the particular airplane for successive differences of control displacement and velocity.

Throttle input $KS_e$ or $C_e$ is supplied to a functional multiplier 264 that multiplies a determined function of $C_e$ with a determined function of airspeed V to provide an output quantity $F_e$. The determined function of $C_e$ is representative of the percent of full horsepower available for the particular throttle opening and the determined function of airspeed V is representative of propeller developed thrust at full horsepower so that the product $F_e$ or "total developed thrust" is obtained from percent H. P. times "thrust" at full H. P. This is accomplished within the computer element 264 by means of mechanical or electrical cams the design of which is based on wind-tunnel data for the particular airplane to be simulated. The cam for percent engine horsepower is actuated by a shaft or other means from the throttle control and the cam for thrust at full horsepower is actuated by a shaft or other means representative of velocity.

The quantity $F_e$ is amplified by follow-up mechanism 266 and sent to component solver 268 that receives as its other input quantity the angle of attack data $A$ and provides outputs $F_e \cos A$ and $F_e \sin A$. The latter quantity $F_e \sin A$ is added by adding mechanism 270 to a quantity $W \cos R \cos P$ from a component solver 272 that receives the quantities $W$, $R$ and $P$ as inputs and that has the quantity $W$ inherently available as a constant multiplying factor to provide an output quantity $F_e \sin A - W \cos R \cos P$. This output is added by mechanism 274 to lift force quantity $F_l$ provided by multiplier mechanism 276 that multiplies velocity data $V$ with $C_l$. The output of adding mechanism 274 is the quantity $F_u = VdP_a$. The quantity $F_u$ is utilized in conjunction with a quantity $A$ to operate standard control switches illustrated diagrammatically at 280 for the stalling mechanism. The quantity $VdP_a$ is multiplied by the reciprocal of velocity $V$ at reciprocal multiplier 282 to provide the output $dP_a$ that is provided as an input quantity to the adding mechanism 212.

The other output of component solver 272, $W \sin R \cos P$ or $F_w$, is supplied to the reciprocal multiplier 284 where it is multiplied with the reciprocal of the velocity to provide the rate $dT_w$ that is utilized in adding mechanism 232.

The other output from component solver 268, $F_e \cos A$, is added by mechanism 286 to drag force $F_d$, providing an output quantity $F_e \cos A - F_d$ that is in turn added to quantity $W \sin(P - A \cos R - T_y \sin R)$ by mechanism 288 to provide $dV$. The rate $dV$ is integrated with respect to time $t$ by integrating mechanism 290 to provide airspeed quantity $V$. The quantity $V$ is supplied to an airspeed transmitter 292 for transmission of representative electrical data to an appropriate indicating instrument at panel 20 (Fig. 1) and to the various multipliers and component solvers as described above.

The other output quantities of component solvers 252 and 256, $T_y \sin R$ and $A \cos R$, are added by mechanism 294 providing an output quantity $T_y \sin R - A \cos R$ that is, in turn, added by mechanism 296 to pitch angle $P$. The resultant quantity is supplied to a cam unit 298 which multiplies a function of this input quantity with weight $W$ to provide the output $W \sin(P - A \cos R - T_y \sin R)$ utilized in adding mechanism 288. The output from adding mechanism 296, is also supplied to component solver 300 which solves this input with airspeed input $V$ to provide vertical and horizontal velocity components $V_v$ and $V_h$, respectively, as outputs. The output $V_v$ is integrated with respect to time $t$ by integrator 302 to provide altitude data $H$ which is sent by transmitter 304 to the change-of-altitude amplifier 124 (Fig. 1), and by transmitter 306 to an appropriate altitude indicator on the instrument panel 20 (Fig. 1). Vertical velocity data $V_v$ is also sent to transmitter 307 for transmission to an appropriate "rate of climb" indicating instrument on the instrument panel 20 (Fig. 1).

The horizontal velocity component $V_h$ is integrated with respect to time $t$ by integrating mechanism 308 to provide change of distance data relative to the ground, which data is transmitted by transmitter 310 to horizontal speed amplifier 136 (Fig. 1).

A flap-control motor 310 provides flap-displacement datum $S_j$ which is supplied to a transmitter 312 for transmission to an appropriate device for indicating flap position on the instrument panel 20 (Fig. 1). The quantity $S_j$ is also supplied to a mechanism at 314 where it is divided into quantities $C_{lj}$, indicative of lift due to flaps, and $A_j$, indicative of increase in $A$ due to flaps. The quantity $A_j$ is added by adding mechanism 316 to quantity $A$, supplied from mechanism 210, providing an output $A + A_j$ that is representative of a drag coefficient determined by a cam function in unit 218 that is multiplied with velocity $V$ in multiplying mechanism 318, providing the output $F_d$ utilized in adding mechanism 286.

The multiplier element 318 operates on the principle, well known in the art, that drag force acting on an airplane wing is equal to the product of a constant times the coefficient of drag times the velocity squared. The cam unit of the element 318 is therefore designed to represent a variable coefficient of drag in accordance to wind-tunnel data. The cam is actuated by a shaft, the positioning of which is representative of $A + A_j$ or the angle at which the mean or average chord line of the wing meets the relative wind and known as angle of attack. The output of element 318 therefore is representative of the drag forces inherently present for successive values of angle of attack and velocity.

The quantity $A$ from mechanism 210 is also supplied to a cam unit 320 that resolves this value into lift data $C_{lo}$ due to the position of the wings. The cam of this element is representative of wind-tunnel data of a variable coefficient of lift and is actuated by a shaft or other means representative of angle of attack. The quantity $C_{lo}$ is added by adding mechanism 322 to the quantity $C_{lj}$ from mechanism 314 to provide the quantity $C_l$ utilized in multiplying mechanism 276. The mechanism multiplies $C_l$ by the velocity squared to provide quantity $F_l$ representative of lift force inherently present for the instant value of velocity and angle of attack.

For a more complete description of the theory of operation of the computer elements, including derivation of the equations upon which the computer element inputs and outputs are based, reference is hereby made to U. S. Navy Publication entitled "Theory of the Aerodynamical Computer" by Harold P. Wicklund and Fritz Steinhardt.

*Operation*

An example of one manner in which the flight trainer of this invention can be operated is given below.

It will be assumed that all optical elements are in proper alignment so that the observer views an image of the model such as would be seen from the cockpit of an actual plane upon a runway in take off position. The periscope head 44 is thus very close to the model 10 and the elevation prism 70 is rotated so that the center line of sight is approximately parallel to the plane of the model. The control elements of the mock cockpit are in neutral or starting position as in an actual airplane preparatory to starting.

The observer seats himself at the controls, adjusts the eyepiece assemblies 54, and puts on the earphones of the intercommunication system 38. He then turns on a switch (not shown) connecting the power supply with the amplifiers and motor elements as previously described.

The device is now ready for the simulated take off. All handling of the flight controls is identical to that in the operation of an actual airplane. As the throttle is opened the noise simulator produces appropriate engine noises. As the plane supposedly moves forward the mock cockpit moves forward on its crab wheels 13. When the control stick 30 is pulled back and the plane apparently climbs, the periscope head 24 retracts accordingly and the pitch angle or elevation prism 70 rotates about its horizontal axis away from the model so that the image formed of the model changes to provide the illusion of climbing to the observer. After the plane is supposedly in flight the operator can manipulate the controls as desired to bank, dive, climb, turn or roll, the cockpit assembly and optical elements moving in accordance with control data from the computer so that from the standpoint of his visual observation the operator appears to be actually completing the desired maneuvers. When the control stick is pushed forward and the plane supposedly dives, the elevation prism 70 rotates about its horizontal axis toward the model and the periscope is extended toward the model. When the control stick and rudder are moved in a manner to produce a coordinated turn the crab wheels 13 and periscope head 44 turn relative to the cart but not relative to each other and masking element 76 and derotating prism 74 also have concomitant rotation in the proper relation to produce the illusion of coordinated banking and turning without slip or skid (i. e. without yawing). When a non-coordinated turn resulting from control displacements exists, the periscope head 44 and crab wheels 13 are also rotated relative to each other by an amount (angle) representative of the magnitude of yaw (i. e. slip or skid) for each particular condition. In response to proper data from the computer unit the derotating prism 74 and mask 76 rotates to the right or left to produce a rolling illusion. A number of such movements can take place at the same time to simulate the various conditions encountered in actual flight maneuvers.

The instantaneous flight conditions at any point in the flight are indicated by the indicating instruments upon the instrument panel. Thus the observer can check conditions by glancing at the image of the instrument panel.

The operator can cut off the power supply at any time during the mock flight and later resume operations at the same point by again closing the power switch.

An instructor observing the model through the scope 48 can direct operations through the intercommunication system 38 or can discuss flight conditions with the student seated within the device.

The flight simulating methods and device of this invention provide valuable aids to the art of flying and flight instruction.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Flight simulating apparatus comprising model of terrain, a mock cockpit assembly including control elements mounted for movement with respect to said model, an optical viewing system including a pitch angle prism and an objective lens mounted upon said cockpit whereby an observer seated in said cockpit may view an image of said model, means for extending and retracting said optical elements with respect to said model in response to control signals corresponding to control data to simulate changes in altitude, means responsive to control signals corresponding to control data for rotating said optical elements in a plane parallel to that of said model to simulate changes in course, means responsive to control signals corresponding to control data for rotating said pitch angle prism in a vertical plane with respect to said model to simulate change of attitude, and means responsive to control signals corresponding to control data for moving said cockpit unit with respect to said model to simulate horizontal velocity, whereby to alter said image as though said image were moving with respect to said model to produce the illusion of flight.

2. Flight simulating apparatus comprising a model of terrain, a mock cockpit assembly including control elements mounted for movement with respect to said model, an optical viewing system mounted on said cockpit whereby an observer seated in said cockpit may view an image of said model, computer means associated with said cockpit assembly for correlating flight characteristics data with control data from said control elements, means for converting the resultant data into electrical signals, means for amplifying said electrical signals, and means responsive to said amplified electrical signals for controlling the movement of said cockpit and the movement of the optical elements of said optical system, whereby to alter said image as though said image were moving with respect to said model to produce the illusion of flight.

3. Flight simulating apparatus comprising a model of terrain, a mock cockpit assembly including control elements mounted for movement with respect to said model, an optical viewing system mounted on said cockpit whereby an observer seated in said cockpit may view said model, said optical viewing system including a retractable periscope having a rotatable head, an elevation prism and objective lens assembly in said rotatable head, said elevation prism being mounted for rotation within said head about an axis perpendicular to the optical center line of said viewing system, rotatable dove prism means in said periscope for governing rotation of the image of said model about the optical axis of said viewing system, means for correlating control data from said control elements with flight characteristics data whereby to provide signals corresponding to apparent course data, actual course data, pitch angle data, roll data, altitude data and horizontal velocity data, means responsive to said apparent course signals for controlling rotation of said periscope head, means responsive to said actual course signals for controlling the direction of movement of said cockpit assembly, means responsive to pitch angle signals for controlling rotation of said elevation prism relative to said periscope head, means responsive to roll signals for controlling rotation of said dove prism, means responsive to altitude signals for controlling the retraction of said periscope and means responsive to said horizontal velocity signals for controlling the speed of movement of said cockpit assembly relative to said model, whereby to control the movement of said cockpit assembly and the above stated optical elements of said viewing system mounted thereon such that the relative movement of the model viewed through said viewing system produces the illusion of flight to the observer.

4. Flight simulating apparatus comprising a three-dimensional model of terrain, a mock cockpit assembly including control elements mounted for movement with respect to said model, an optical viewing system mounted on said cockpit whereby an observer seated in said cockpit may view an image of said model, said optical viewing system including an elevation prism for collecting rays from said model and mounted for rotation about an axis perpendicular to said model and also for rotation about an axis perpendicular to the center line of said viewing system, an objective lens assembly in receiving relation to said elevation prism, rotatable prism means in receiving relation to said objective lens for rotating said image about its center, optical collimating means for paralleling the rays from said rotatable prism, a viewing head for projecting the image into the field of vision of the observer, means for correlating control data from said control elements with flight characteristics data whereby to provide signals corresponding to apparent course data, actual course data, roll data, altitude data, and horizontal velocity data, means responsive to said apparent course signals for controlling rotation of said elevation prism about said axis perpendicular to said model, means responsive to actual course signals for controlling the direction of movement of said cockpit assembly, means responsive to pitch angle signals for controlling the rotation of said elevation prism about said axis perpendicular to the optical center line, means responsive to roll signals for controlling the rotation of said rotatable prism, means responsive to altitude signals for retracting and extending said optical system with respect to said model, means responsive to said horizontal velocity signals for controlling the speed of movement of said cockpit assembly relative to said model, whereby to control the movement of said image of said model so as to produce the illusion of flight to the observer.

5. Flight simulating apparatus comprising a model of terrain, a cockpit assembly having control elements including a control stick, an optical viewing system including a rotatable prism whereby an observer seated in said cockpit may view said model, means for correlating control data with flight characteristics data to provide velocity signals, means for multiplying data due to the lateral motion of said control stick with said velocity data to provide rate of roll data, means for integrating said rate of roll data with respect to time to provide angle of roll signals, means for amplifying said angle of roll signals, and means responsive to said amplified signals for controlling the rotation of said prism whereby to provide an image of said model corresponding to the instant simulated angle of roll condition.

6. Flight simulating apparatus comprising a model of terrain, a cockpit assembly having control elements including a control stick, an optical viewing system including a rotatable prism, whereby an observer seated in said cockpit may view said model, means for correlating control data with flight characteristics data to provide velocity signals, means for multiplying data due to the lateral motion of said control stick with said velocity data to provide rate of roll data, means for correlating control data with flight characteristics data to provide additional rate of roll data due to simulated pitching and turning conditions, means for adding said first mentioned rate of roll data to said second mentioned rate of roll data to provide total rate of roll data, means for integrating said total rate of roll data with respect to time to provide angle of roll signals, means for amplifying said angle of roll signals, and means responsive to said amplified signals for controlling the rotation of said prism whereby to provide an image of said model corresponding to the instant simulated angle of roll condition.

7. Flight simulating apparatus comprising a model of terrain, a cockpit assembly having control elements including a control stick, an optical viewing system including a rotatable prism whereby an observer seated in said cockpit may view said model, means responsive to lateral movement of said control stick for providing coefficient of roll data in accordance with wind tunnel data for the instant average angle that the movable control surfaces of the simulated plane make with the corresponding fixed surfaces for each position of the control stick, means for correlating control data with flight characteristics data to provide velocity data, means for multiplying said coefficient of roll data with said velocity data to provide angle of roll signals, and means responsive to said angle of roll signals for controlling the rotation of said prism whereby to provide an image of said model corresponding to the instant simulated angle of roll condition.

8. Flight simulating apparatus comprising a model of terrain, a movable cockpit assembly having control elements including a throttle, an optical viewing system mounted upon said cockpit whereby an observer seated in said cockpit may view said model, means responsive to said throttle for providing data representative of the percentage engine horsepower available for the instant position of said throttle, means for providing data representative of thrust force at full engine horsepower for the instant simulated velocity, means for multiplying said percentage data with said thrust force data to provide instant propeller thrust force data, means for correlating said instant propeller thrust force data with other instant flight characteristics data to provide velocity data, means for resolving said velocity data into vertical and horizontal component signals, and means responsive to said horizontal component signal for controlling the velocity of horizontal movement of said cockpit assembly with respect to said model.

9. Flight simulating apparatus comprising a model of terrain, a movable cockpit assembly, an optical system mounted thereon whereby an observer seated in said cockpit may view said model, a computer for correlating control data from said cockpit with flight characteristics data to provide output signals for controlilng the movement of the optical elements of said optical system to produce an illusion of flight, said computer including means for providing coefficient of lift data in accordance with wind tunnel data for the instant angle of attack of the simulated plane, means for multiplying said coeffiicent of lift data with the square of the instant velocity to provide lift force data, means for correlating said lift force data with other flight characteristics data, and means for applying the resultant output signals that correspond to the data to control said optical elements.

10. Flight simulating apparatus comprising a model of terrain, a movable cockpit assembly, an optical system mounted thereon whereby an observer seated in said cockpit may view said model, a computer for correlating control data from said cockpit with flight characteristics data to provide output signals for controlling the movement of the optical elements of said optical system to produce an illusion of flight, said computer including means for providing coefficient of drag data in accordance with wind tunnel data for the instant angle of attack of the simulated plane, means for multiplying said coefficient of drag data with the square of instant velocity to provide drag force data, means for correlating this data with other flight characteristics data, and means for applying the resultant output signals corresponding to the data to control said optical elements.

HAROLD P. WICKLUND.

REFERENCES CITED

The following references are of record in the file of this patent:

UNITED STATES PATENTS

| Number | Name | Date |
|---|---|---|
| 2,099,857 | Link, Jr. | Nov. 23, 1937 |
| 2,164,412 | Koster | July 4, 1939 |
| 2,316,181 | Ocker | Apr. 13, 1943 |
| 2,326,764 | Crane | Aug. 17, 1943 |
| 2,329,612 | Hill | Sept. 14, 1943 |
| 2,366,603 | Dehmel | Jan. 2, 1945 |
| 2,374,401 | White | Apr. 24, 1945 |
| 2,395,477 | Gumley | Feb. 26, 1946 |
| 2,413,633 | Jones | Dec. 31, 1946 |
| 2,428,767 | Albert | Oct. 14, 1947 |
| 2,439,168 | Kail | Apr. 6, 1948 |
| 2,439,169 | Kittredge | Apr. 6, 1948 |
| 2,442,297 | Link | May 25, 1948 |
| 2,443,604 | Dehmel | June 22, 1948 |
| 2,460,743 | Germanton | Feb. 1, 1949 |
| 2,471,966 | Lukacs | May 31, 1949 |
| 2,475,314 | Dehmel | July 5, 1949 |
| 2,485,435 | Dehmel | Oct. 18, 1949 |
| 2,494,508 | Dehmel | Jan. 10, 1950 |
| 2,510,500 | Hayes | June 6, 1950 |

FOREIGN PATENTS

| Number | Country | Date |
|---|---|---|
| 575,688 | Great Britain | Feb. 28, 1946 |